(12) United States Patent
Kim et al.

(10) Patent No.: US 7,985,504 B2
(45) Date of Patent: Jul. 26, 2011

(54) LITHIUM SECONDARY BATTERY OF IMPROVED LOW-TEMPERATURE POWER PROPERTY

(75) Inventors: Jim Kim, Yongin-si (KR); Suk Myung Roh, Goyang-si (KR); Youngjoon Shin, Daejeon (KR); Sunjung Hwang, Busan (KR)

(73) Assignee: LG Chem, Ltd, Seoul (KR)

( * ) Notice: Subject to any disclaimer, the term of this patent is extended or adjusted under 35 U.S.C. 154(b) by 118 days.

(21) Appl. No.: 12/299,273

(22) PCT Filed: Apr. 27, 2007

(86) PCT No.: PCT/KR2007/002069
§ 371 (c)(1),
(2), (4) Date: Sep. 18, 2009

(87) PCT Pub. No.: WO2007/126257
PCT Pub. Date: Nov. 8, 2007

(65) Prior Publication Data
US 2010/0015524 A1   Jan. 21, 2010

(30) Foreign Application Priority Data

May 1, 2006   (KR) .................... 10-2006-0039137

(51) Int. Cl.
*H01M 4/90* (2006.01)
*H01M 4/13* (2006.01)
*H01M 4/58* (2006.01)
*H01M 4/02* (2006.01)
*H01M 4/36* (2006.01)

(52) U.S. Cl. ............. 429/231.95; 429/209; 429/218.1; 429/226; 252/182.1

(58) Field of Classification Search ............ 429/207, 429/209, 218.1, 226, 231.95; 252/182.1
See application file for complete search history.

(56) References Cited

U.S. PATENT DOCUMENTS

| | | | |
|---|---|---|---|
| 6,558,847 B1 * | 5/2003 | Kawakami et al. | 429/231.95 |
| 2002/0086216 A1 | 7/2002 | Sekino et al. | |
| 2003/0198871 A1 | 10/2003 | Sekino et al. | |
| 2006/0046155 A1 * | 3/2006 | Inagaki et al. | 429/332 |
| 2006/0078787 A1 | 4/2006 | Sato et al. | |

FOREIGN PATENT DOCUMENTS

| | | |
|---|---|---|
| JP | 1994-302315 A | 10/1994 |
| JP | 1998-188980 A | 7/1998 |
| JP | 2005-142047 A | 6/2005 |
| JP | 2005-317509 A | 11/2005 |
| KR | 1999-0033387 A | 5/1999 |
| KR | 10-2000-0076975 A | 12/2000 |
| KR | 2004-0060944 A | 7/2004 |

\* cited by examiner

*Primary Examiner* — Dah-Wei D. Yuan
*Assistant Examiner* — Claire L Roe
(74) *Attorney, Agent, or Firm* — Birch Stewart Kolasch & Birch, LLP

(57) ABSTRACT

Provided is a lithium secondary battery which has excellent low-temperature power output characteristics by the inclusion of a given amount of a lithium metal oxide and/or a lithium metal sulfide in an anode mix for a lithium secondary battery containing a carbon-based anode active material and is thereby capable of being used as a power source for electric vehicles (EVs) and hybrid electric vehicles (HEVs) that must provide high-power output at low temperatures as well as at room temperature.

8 Claims, No Drawings

LITHIUM SECONDARY BATTERY OF IMPROVED LOW-TEMPERATURE POWER PROPERTY

FIELD OF THE INVENTION

The present invention relates to a lithium secondary battery having improved low-temperature power output characteristics. More specifically, the present invention relates to a lithium secondary battery which has excellent low-temperature power output characteristics by the inclusion of a given amount of a lithium metal oxide and/or a lithium metal sulfide in an anode active material and is thereby capable of being used as a power source for electric vehicles (EVs) and hybrid electric vehicles (HEVs) that must provide high-power output at low temperatures as well as at room temperature.

BACKGROUND OF THE INVENTION

Technological development and increased demand for mobile equipment have led to a rapid increase in the demand for secondary batteries as an energy source. Among other things, a great deal of research and study has been focused on lithium secondary batteries having a high-energy density and a high-discharge voltage. These lithium secondary batteries are also commercially available and widely used.

Further, increased environmental concern has drawn a great deal of intensive research on electric vehicles (EVs) and hybrid electric vehicles (HEVs) which are capable of replacing fossil fuel-driven vehicles such as gasoline vehicles and diesel vehicles, one of the primary causes of air pollution. Although nickel-hydrogen (Ni—$H_2$) secondary batteries are largely employed as power sources for EVs and HEVs, numerous studies have been actively made to use lithium secondary batteries having a high-energy density and a high-discharge voltage, consequently with some commercialization outputs.

Generally, the lithium secondary battery is comprised of a structure having an electrode assembly composed of a cathode, an anode and a porous separator disposed between the cathode and the anode, and with impregnation of the electrode assembly with a non-aqueous electrolyte containing a lithium salt, wherein the cathode and the anode are fabricated by applying electrode active materials to current collectors. As the cathode active material, lithium cobalt oxides, lithium manganese oxides, lithium nickel oxides, lithium composite oxides and the like are primarily used. As the anode active material, carbon-based materials are usually used.

In order to use such a lithium secondary battery as a power source for electric vehicles (EVs) and hybrid electric vehicles (HEVs), the battery is required to have the performance that is capable of operating even under more severe conditions than those under which mobile phones, notebook computers, personal digital assistants (PDAs) and the like operate. For example, since vehicles must be operable even under low-temperature conditions such as winter seasons, representative examples of requirements necessary for the aforementioned power source may include excellent power output characteristics at low temperatures. If the power source cannot provide sufficient power output at low temperatures, driving of a power system is not going smoothly. Even further, if the power output does not reach a minimum power output necessary for starting of the vehicle engine, the operation of the vehicle itself may be impossible.

Attempts to improve low-temperature power output characteristics of the lithium secondary battery have been made primarily toward performance improvements in electrolytes and anode materials. As conventional arts relating to improvements in the performance of anode materials, there have been proposed a technology of enhancing power output characteristics by doping a surface of an anode active material with a conductive metal to thereby facilitate migration of ions and electrons, and a technology of using active materials having excellent rate properties instead of carbon-based materials, as the anode active material. However, the technology of doping the surface of the anode active material with the metal suffers from fundamental problems associated with a difficulty to achieve a desired level of doping in the mass production process. In addition, the technology using anode active materials having excellent rate properties just provides improvements in low-temperature properties at the sacrifice of high-temperature properties and battery capacity, that is, suffers from disadvantages of decreased high-temperature performance and capacity.

Therefore, there is a strong need in the art for the development of a technique which is capable of easily and conveniently improving low-temperature power output characteristics while not causing substantial decreases in the high-temperature properties and battery capacity.

SUMMARY OF THE INVENTION

Therefore, the present invention has been made to solve the above-mentioned problems and other technical problems that have yet to be resolved.

Specifically, it is an object of the present invention to provide an anode mix for a lithium secondary battery, which is capable of improving low-temperature power output characteristics while minimizing decreases in the high-temperature properties and capacity of the battery, and can be prepared by an easy and convenient process.

It is another object of the present invention to provide a lithium secondary battery which is capable of providing excellent power output even when it is used under severe operation conditions, particularly at low temperatures, such as in electric vehicles (EVs) and hybrid electric vehicles (HEVs), by the inclusion of the aforementioned anode mix.

DETAILED DESCRIPTION OF PREFERRED EMBODIMENTS

In accordance with an aspect of the present invention, the above and other objects can be accomplished by the provision of an anode mix for a lithium secondary battery comprising a carbon-based anode active material, wherein the anode mix contains at least one compound selected from the group consisting of lithium metal oxides represented by Formula I below and lithium metal sulfides represented by Formula II below in an amount of 1 to 50% by weight, based on the total weight of the anode mix:

$$Li_xM_yO_z \qquad (I)$$

wherein
M is Ti, Sn, Cu, Pb, Sb, Zn, Fe, In, Al or Zr; and
x, y and z are determined by an oxidation number of M.

$$Li_xM_yS_{z'} \qquad (II)$$

wherein
M is Ti, Sn, Cu, Pb, Sb, Zn, Fe, In, Al or Zr; and
x', y' and z' are determined by an oxidation number of M.

Therefore, the anode mix in accordance with the present invention can improve low-temperature properties with substantially no deterioration in high-temperature properties and capacity of a battery, by the incorporation of a given amount of the lithium metal oxide of Formula I and/or the lithium metal sulfide of Formula II as an additive into a conventional carbon-based active material-containing anode mix.

Among some of conventional arts relating to lithium secondary batteries, there are known technologies that some materials out of the additives in accordance with the present invention are utilized in the anode material.

For example, Japanese Unexamined Patent Publication No. 2005-317509 discloses a lithium secondary battery using $Li_4Ti_5O_{12}$ as an anode active material and a graphitized vapor-phase growth carbon fiber as a conductive material. Japanese Unexamined Patent Publication No. 2005-142047 discloses a battery using $Li_4Ti_5O_{12}$ as an anode active material, wherein a lithium transition metal oxide containing nickel atoms and cobalt atoms in a ratio of 1:1 is used as a cathode active material. Further, Japanese Unexamined Patent Publication No. 1998-188980 discloses a technique of improving an energy density of a battery by increasing the battery capacity and operating voltage, via the use of a lithium-containing composite oxide mainly comprising Ge, Sn and Pb in admixture with a lithium compound as an anode active material.

Even though the aforementioned prior arts disclose examples of using lithium titanium oxides and the like in the lithium secondary batteries, lithium titanium oxides and the like are employed as substitutes for carbon-based anode active materials to thereby improve charge/discharge cycle characteristics. Further, none of the aforementioned prior arts teach or imply that low-temperature power output characteristics of the lithium secondary battery can be improved when such oxides as additives are used in the carbon-based active material-containing anode mix.

Therefore, upon considering the fact that the low-temperature power output characteristics of the lithium secondary battery are improved by adding a given amount of the lithium metal oxide of Formula I and/or the lithium metal sulfide of Formula II to the carbon-based active material-containing anode mix, the technique of the present invention is a novel art that cannot be inferred or confirmed from the conventional arts.

The anode mix of the present invention, as illustrated hereinbefore, employs carbon-based active materials as the anode active material.

Kinds of the carbon-based active materials, utilized as the anode active material in the lithium secondary battery, are classified into soft carbon having a layered crystal structure of highly graphitized carbon (graphene structure: planar layers of carbon atoms arranged in hexagonal honeycomb), and hard carbon having a mixed structure of such a layered crystal structure and an amorphous structure. In addition, carbon having a completely layered crystal structure such as natural graphite is also separately classified as graphite. That is, kinds of the carbon-based anode active material may be broadly divided into graphite and soft carbon as crystalline carbon, and hard carbon as amorphous carbon. Therefore, all kinds of various carbon materials can be used in the present invention. Preferably, a mixture of crystalline carbon and amorphous carbon may be used. Such a carbon mixture is preferably used as the anode active material of the present invention in that it is advantageous to design a charge/discharge power ratio required in desired applications depending upon a mixing ratio of crystalline carbon and amorphous carbon, it is advantageous for determination of a fuel gauge, and it is also possible to achieve high lifespan characteristics (calendar life). As an example of a preferred anode active material, mention may be made of a mixture of hard carbon and graphite.

The lithium metal oxide of Formula I and the lithium metal sulfide of Formula II, which are added to improve the low-temperature power output characteristics in the anode mix of the present invention, are materials of forming a potential of from 0 volt to less than 2 volts, relative to a lithium metal reference electrode. Upon application of instantaneous power at a low temperature, this may cause intercalation and deintercalation of lithium ions into/from these materials to thereby achieve instantaneous power output that cannot be realized in the carbon-based anode active material. Therefore, in the electric vehicles (EVs) and hybrid electric vehicles (HEVs) using the lithium secondary battery as the power source, it is possible to provide a desired power output upon instantaneous operation of 1 to 20 sec, for example when starting the vehicle at a low temperature.

Preferred examples of the lithium metal oxides of Formula I may include, but are not limited to, $Li_4Ti_5O_{12}$ and $LiTi_2O_4$.

Preferred examples of the lithium metal sulfides of Formula II may include, but are not limited to, $LiTiS_2$.

These lithium metal oxides or lithium metal sulfides may be used as the aforementioned materials alone or in any combination thereof. Where appropriate, mixtures of the lithium metal oxides and the lithium metal sulfides may also be used.

A content of the lithium metal oxide and/or the lithium metal sulfide, as discussed hereinbefore, is in a range of 1 to 50% by weight, based on the total weight of the anode mix. If the content of the oxide and/or the sulfide is excessively low, it is difficult to obtain a desired level of improvements in the low-temperature power output characteristics of the battery. Conversely, if the content of the oxide and/or the sulfide is excessively high, this may undesirably lead to significant decreases in high-temperature properties and capacity of the battery. More preferably, the content of the oxide and/or the sulfide is in a range of 5 to 30% by weight.

Generally, certain amounts of a conductive material and a binder are added to the anode mix. If necessary, a filler may be further added to the anode mix.

The conductive material serves to enhance a conductivity of an electrode active material and is typically added in an amount of 1 to 30% by weight, based on the total weight of the electrode mix including the electrode active material. There is no particular limit to the conductive material, so long as it has a suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the electrode active material and the conductive material, and in binding of the electrode active material to the current collector. The binder is typically added in an amount of 1 to 50% by weight, based on the total weight of the electrode mix. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an ingredient used to inhibit electrode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

However, other components may be further added within the ranges that are not detrimental to desired effects of the present invention, and it should be understood that all of those additional components fall within the scope of the present invention.

In accordance with another aspect of the present invention, there is provided a lithium secondary battery comprising an anode fabricated with the aforementioned anode mix, a cathode, a separator and a lithium salt-containing non-aqueous electrolyte.

The anode is generally fabricated by adding the anode mix composed of an active material, a conductive material and a binder to a solvent such as NMP to thereby prepare an electrode slurry and applying the resulting slurry to a current collector, followed by drying and pressing.

The anode current collector is generally fabricated to have a thickness of 3 to 500 µm. There is no particular limit to materials for the anode current collector, so long as they have a suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. The anode current collector may also be processed to form fine irregularities on the surfaces thereof so as to enhance adhesive strength to the anode active material and the like. In addition, the anode current collector may be used in various forms including films, sheets, foils, nets, porous structures, foams and non-woven fabrics.

Similar to the anode, the cathode is fabricated by applying the cathode mix composed of a cathode active material, a conductive material and a binder in the form of a slurry to a current collector, followed by drying and pressing.

Examples of the cathode active materials that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, $Cu_2V_2O_7$; Ni-site type lithium nickel oxides of Formula $LiNi_{1-x}M_xO_2$ (M=Co, Mn, Al, Cu, Fe, Mg, B, or Ga, and $0.01 \leq x \leq 0.3$); lithium manganese composite oxides of Formula $LiMn_{2-x}M_xO_2$ (M=Co, Ni, Fe, Cr, Zn, or Ta, and $0.01 \leq x \leq 0.1$), or Formula $Li_2Mn_3MO_8$ (M=Fe, Co, Ni, Cu, or Zn); $LiMn_2O_4$ wherein a portion of Li is substituted with alkaline earth metal ions; disulfide compounds; and $Fe_2(MoO_4)_3$, $LiFe_3O_4$, etc.

Among these materials, more preferred are lithium manganese oxides such as $LiMn_2O_4$, and lithium nickel-manganese-cobalt composite oxides such as $LiNi_{1/3}Mn_{1/3}Co_{1/3}O_2$, which are inexpensive and highly safe and exhibit excellent power output.

The cathode current collector is generally fabricated to have a thickness of 3 to 500 µm. There is no particular limit to materials for the cathode current collector, so long as they have a high conductivity without causing chemical changes in the fabricated battery. As examples of materials for the cathode current collector, mention may be made of stainless steel, aluminum, nickel, titanium, sintered carbon, and aluminum or stainless steel which was surface-treated with carbon, nickel, titanium or silver. Similar to the anode current collector, the cathode current collector may also be processed to form fine irregularities on the surface thereof so as to enhance adhesive strength to the cathode active material and the like. In addition, the cathode current collector may take various forms including films, sheets, foils, nets, porous structures, foams and non-woven fabrics.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of an electrolyte and a lithium salt. As the electrolyte, a non-aqueous liquid electrolyte, an organic solid electrolyte, or an inorganic solid electrolyte may be utilized.

As the non-aqueous liquid electrolyte that can be used in the present invention, for example, mention may be made of aprotic organic solvents such as N-methyl-2-pyrrolidone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The lithium secondary battery according to the present invention may be preferably used as a unit battery for high-power, large-capacity batteries or battery packs, particularly as power sources for vehicles such as electric vehicles (EVs) and hybrid electric vehicles (HEVs), requiring high-power output even under low temperature conditions.

EXAMPLES

Now, the present invention will be described in more detail with reference to the following Examples. These examples are provided only for illustrating the present invention and should not be construed as limiting the scope and spirit of the present invention.

Example 1

A mixture of $LiMn_2O_4$ and $LiNi_{1/3}Mn_{1/3}Co_{1/3}O_2$ (9:1, w/w) as a cathode active material, Super-P as a conductive material and polyvinylidene fluoride (PVDF) as a binder in a weight ratio of 85:10:5 were mixed in a solvent (N-methylpyrrolidone) to prepare a slurry. The resulting slurry was uniformly applied to aluminum foil, dried in a convection oven at 130° C., and pressed to fabricate a cathode.

A mixture of hard carbon and graphite (9:1, w/w) as an anode active material, Super-P as a conductive material, polyvinylidene fluoride (PVDF) as a binder, and $Li_4Ti_5O_{12}$ as an additive to improve low-temperature power output characteristics in a weight ratio of 75:15:5:5 were mixed in a solvent (N-methylpyrrolidone) to prepare a slurry. The resulting slurry was uniformly applied to copper foil, dried in a convection oven at 130° C., and pressed to fabricate an anode.

A lithium salt-containing non-aqueous electrolyte was prepared by adding 1M $LiPF_6$ to a mixed solvent of PC/DMC (70:30, v/v).

Then, a porous polyethylene film (Celgard™) as a separator was interposed between the anode and the cathode fabricated as above, and the above-prepared lithium salt-containing non-aqueous electrolyte was added to the resulting electrode assembly in a dry box under an argon atmosphere, thereby fabricating a lithium secondary battery.

Example 2

A battery was fabricated in the same manner as in Example 1, except that 30% by weight of $Li_4Ti_5O_{12}$ was added upon fabrication of an anode.

Example 3

A battery was fabricated in the same manner as in Example 1, except that an equal amount of $LiTiS_2$ was added instead of $Li_4Ti_5O_{12}$, upon fabrication of an anode.

Example 4

A battery was fabricated in the same manner as in Example 1, except that 15% by weight of $LiTi_2O_4$ was added instead of $Li_4Ti_5O_{12}$, upon fabrication of an anode.

Comparative Example 1

A battery was fabricated in the same manner as in Example 1, except that $Li_4Ti_5O_{12}$ was not added upon fabrication of an anode, and an anode active material, a conductive material and a binder were used in a weight ratio of 90:5:5.

Experimental Example 1

Batteries fabricated in Examples 1 to 4 and Comparative Example 1 were respectively discharged at −30° C., 50% SOC (State of Charge) and 10 C-rate for 5 seconds to thereby measure a voltage drop. The thus-obtained results are set forth in Table 1 below.

TABLE 1

|  | Ex. 1 | Ex. 2 | Ex. 3 | Ex. 4 | Comp. Ex. 1 |
|---|---|---|---|---|---|
| Voltage Drop | 1.65 V | 1.50 V | 1.72 V | 1.75 V | 1.9 V |

As can be seen from Table 1, batteries of Examples 1 to 4 according to the present invention exhibited superior power output due to a low voltage drop at a low temperature. On the other hand, the battery of Comparative Example 1 exhibited significantly low power output at a low temperature, as compared to the batteries of Examples 1 to 4.

INDUSTRIAL APPLICABILITY

As apparent from the above description, an anode mix according to the present invention and a lithium secondary battery comprising the same have excellent power output characteristics at a low temperature, and therefore can be preferably used in medium/large battery systems such as power sources for electric vehicles (EVs) and hybrid electric vehicles (HEVs) forced to be in operation under severe conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising a cathode, an anode, a separator and a lithium salt-containing non-aqueous electrolyte, wherein the cathode comprises a mixture of a lithium manganese oxide and a lithium nickel-manganese-cobalt composite oxide as a cathode active material; and wherein the anode comprises an anode mix for a lithium secondary battery which comprises a carbon-based anode active material, in which the anode mix contains at least one compound selected from the group consisting of lithium metal oxides represented by Formula I and lithium metal sulfides represented by Formula II in an amount of 1 to 50% by weight, based on the total weight of the anode mix:

$$Li_xM_yO_z \quad (I)$$

wherein

M is Ti, Sn, Cu, Pb, Sb, Zn, Fe, In, Al or Zr; and x, y and z are determined by an oxidation number of M.

$$Li_{x'}M_{y'}S_{z'} \quad (II)$$

wherein

M is Ti, Sn, Cu, Pb, Sb, Zn, Fe, In, Al or Zr; and x', y' and z' are determined by an oxidation number of M.

2. The lithium secondary battery according to claim 1, wherein the carbon-based active material is a mixture of crystalline carbon and amorphous carbon.

3. The lithium secondary battery according to claim 2, wherein the mixture is a mixture of hard carbon and graphite.

4. The lithium secondary battery according to claim 1, wherein the lithium metal oxide of Formula I is $Li_4Ti_5O_{12}$, $LiTi_2O_4$ or a mixture thereof.

5. The lithium secondary battery according to claim 1, wherein the lithium metal sulfide of Formula II is $LiTiS_2$.

6. The lithium secondary battery according to claim 1, wherein the content of the compound is in the range of 5 to 30% by weight, based on the total weight of the anode mix.

7. The lithium secondary battery according to claim 1, further comprising a conductive material and a binder, and a filler.

8. The battery according to claim 1, wherein the battery is used as a power source for an electric vehicle (EV) or a hybrid electric vehicle (HEV), requiring low-temperature power output characteristics.

* * * * *